Jan. 12, 1926. 1,569,698
H. F. BECHMAN
TUBULAR STEREOTYPE PLATE CASTING MACHINE
Filed August 14, 1922   6 Sheets-Sheet 1

Inventor
Henry F. Bechman
By Alexander Sowell
Attorneys.

Jan. 12, 1926. 1,569,698
H. F. BECHMAN
TUBULAR STEREOTYPE PLATE CASTING MACHINE
Filed August 14, 1922 6 Sheets-Sheet 5

H. F. BECHMAN 1,569,698

TUBULAR STEREOTYPE PLATE CASTING MACHINE

Filed August 14, 1922    6 Sheets-Sheet 6

Fig. 8.

Inventor.
Henry F. Bechman
By Alexander & Powell
Attorneys.

Patented Jan. 12, 1926.

1,569,698

UNITED STATES PATENT OFFICE.

HENRY F. BECHMAN, OF BATTLE CREEK, MICHIGAN, ASSIGNOR TO DUPLEX PRINTING PRESS COMPANY, OF BATTLE CREEK, MICHIGAN, A CORPORATION OF MICHIGAN.

TUBULAR-STEREOTYPE-PLATE-CASTING MACHINE.

Application filed August 14, 1922. Serial No. 581,668.

*To all whom it may concern:*

Be it known that I, HENRY F. BECHMAN, a citizen of the United States, residing at Battle Creek, in the county of Calhoun and State of Michigan, have invented certain new and useful Improvements in Tubular-Stereotype-Plate-Casting Machines; and I hereby declare that the following is a full, clear, and exact description thereof, reference being had to the accompanying drawings, which form part of this specification.

This invention is a novel improvement in apparatus for making tubular stereotype plates, and is particularly designed for making single-page-tubular-plate-printing-plates, and the principal object of the invention is to provide an apparatus whereby such plates may be rapidly cast and then directed into suitable plate trimming and finishing mechanism, which latter, however, form no part of the present invention.

Minor objects of the invention are to provide a novel casting box for casting tubular stereotype plates; to provide novel means for forming a groove in the tubular plate during the casting operation; to provide novel means for freeing the plate after the casting operation; to provide novel means for holding the matrix during the casting operation; and novel means for stripping the matrix after the casting operation. Other minor objects and novel features of the invention will be hereinafter explained.

In the accompanying drawings I have illustrated one form of apparatus embodying the invention and will describe the same with reference to said drawings to enable others to adopt and use the invention, but the invention should not be restricted to the specific construction and combination of parts illustrated and therefore I refer to the claims for summaries of the essentials of the invention and of the novel features of construction and novel combinations of parts for all of which protection is desired.

Figure 1:
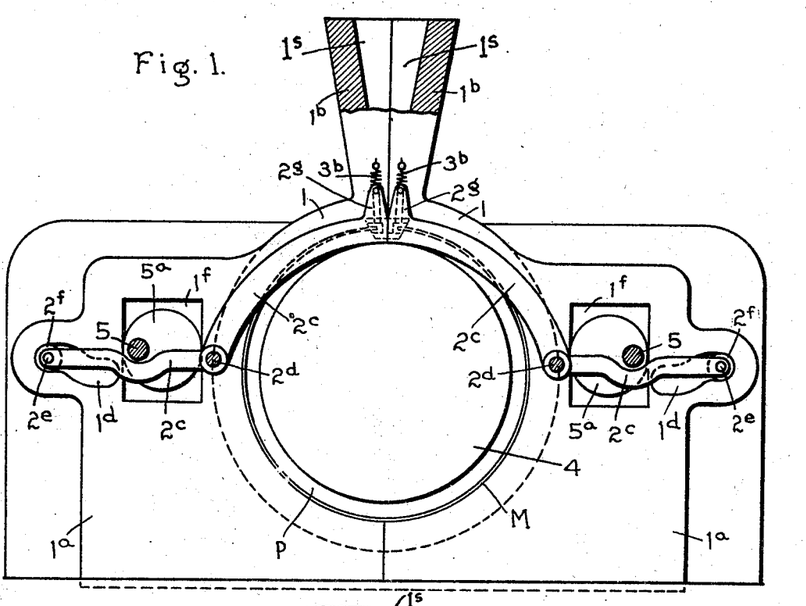
Fig. 1 is a sectional side elevation of the casting box closed, with the rear side frame removed.
Figure 8:
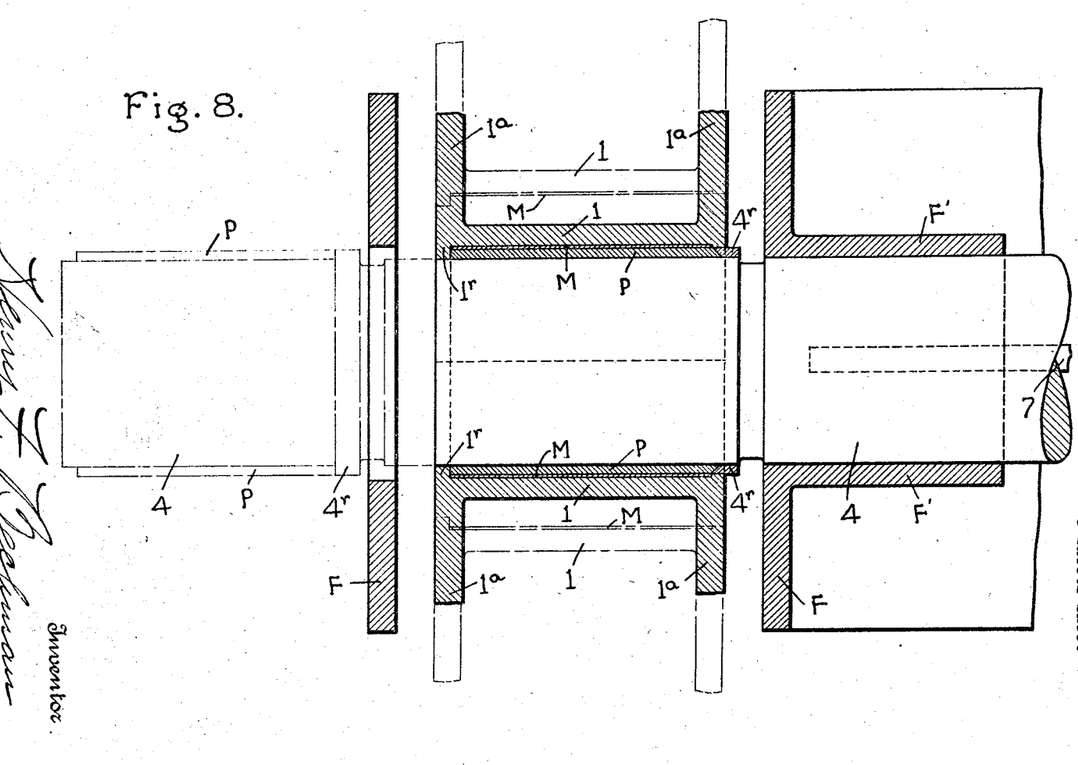
Fig. 8 is a reduced diagrammatic longitudinal horizontal sectional view of the box.

As shown, the box proper is formed of two complemental separable members or halves 1, which are slidably mounted on the main frame, which may be of any suitable construction. As shown, each member 1 of the box has a semi-cylindric recess in its inner end or face, and has outwardly projecting flanges 1ª adjacent its ends (see Figs. 5 and 6) said flanges being parallel and suitably guided in the frame so that the members 1 may be accurately guided toward or away from each other. When the members are moved so that their inner ends meet, the semi-cylindric recesses therein form a cylindric chamber, as indicated in Fig. 1, surrounding a cylindric core 4, which corresponds in external diameter to the interior diameter of the finished plate; and when the box is closed the walls of the recesses in parts 1 are adapted to support the matrix M at such a distance from the periphery of the core 4 that a plate of the proper thickness will be formed by filling the space between the matrix and the core with molten metal, as indicated in Figs. 1, 2, and 8.

Each member 1 of the box is provided with a recess or slot in its inner end and upper side which together form a mouth or slot 1ᶜ (see Figs. 1 and 2) by which the molten metal is directed into the box, said slot extending lengthwise of the box. Each member 1 of the box preferably has an upstanding flanges 1ᵇ adjacent the pouring slot. The inner side of such flange is recessed, the recess being preferably tapered, as a 1ˢ, as shown, so that it enlarges from bottom to top; and when the box is closed the flanges 1ᵇ meet and the recesses 1ˢ in their meeting faces from a pouring funnel connecting with mouth 1ᶜ, as indicated in Fig. 2, by which the molten metal is directed into mouth or slot 1ᶜ of the box.

Figure 2:
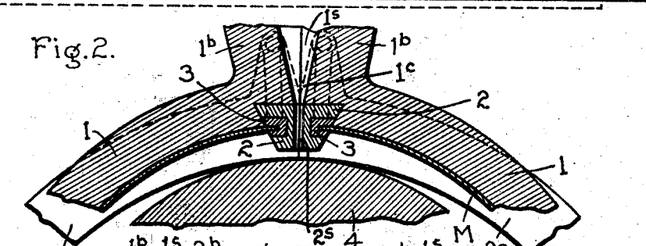
Fig. 2 is an enlarged detail sectional view showing the groove forming bars and matrix holding bars in the positions assumed when the box is closed.
Figure 3:
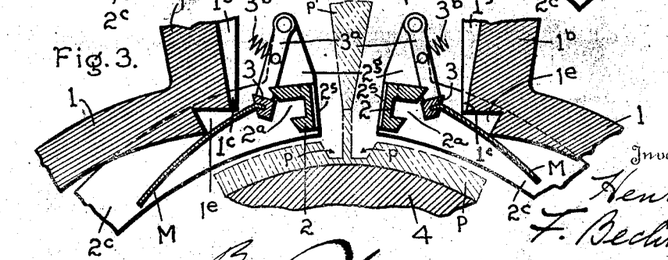
Fig. 3 is a view similar to Fig. 2 showing the positions assumed by the parts when the box is opened.

Preferably a recess 1ᵉ is formed in the meeting edge of each member of the box just below the flange 1ᵇ, such recess being preferably angular in cross section, as shown in Figs. 2 and 3, and it is adapted to be filled by a bar 2 also angular in cross section. Each bar 2 is attached to and supported by the inner ends of lever 2ᶜ, which are pivoted about midway of their length on the side frames, as at 2ᵈ (see Figs. 1, 4 and 6). The outer ends of the levers 2ᶜ preferably carry pins 2ᵉ (which may be provided with rollers 2ᶠ) engaging cam slots 1ᵈ in the adjacent side flanges 1ᵃ of the members 1, so that when the said members are moved toward each other the levers 2ᶜ will be rocked and turn the bars 2 into position to engage the recesses 1ᵉ, (as in Fig. 2); and when the members 1 are separated the levers 2ᶜ are rocked and move the bars 2 to the positions shown in Fig. 3.

Each bar 2 has a slot 2ˢ in its inner or meeting face which slots together form a pouring mouth which communicates with the mouth 1ᶜ when the box is closed, as shown in Fig. 2, and directs the metal into the mold chamber.

Each bar 2 also has a longitudinal slot 2ᵃ in its side next to the related recess 1ᵉ, which slot is adapted to receive a matrix holder, which may be of any suitable kind. As shown the holder comprises a longitudinally grooved rod 3 connected at its ends to link 3ᵃ which are pivotally suspended from arms 2ᵍ on the ends of the related levers 2ᶜ and adjacent the ends of the bars 2, as indicated in the drawings (see Figs. 3 and 6). Contractile springs 3ᵇ are connected to the links 3ᵃ and to adjacent parts of the member 1ᵇ of the box, and said springs normally tend to swing the links 3ᵃ and draw the matrix holders 3 out of the slots 2ᵃ, when the box is open (see Figs. 3 and 4). When the members of the box are moved inward toward each other, the cam slots 1ᵈ cause the levers 2ᶜ to rock so as to bring bars 2 into position to enter the notches 1ᵉ, and as the box members more nearly approach each other the matrix holders 3 are caused to enter the slots 2ᶠ and the bars 2 to enter the notches 1ᵉ thereby holding the matrix M securely in position in the box (see Figs. 1 and 2).

Before the box is closed a matrix M of any suitable kind is manually placed around the core 4 and between it and parts 1, and the opposed ends of the matrix are engaged with the holders 3; then when the box is closed the matrix is automatically properly positioned within the box and around the core and the edges of the matrix are held out of the path of the incoming molten metal (see Fig. 2) and the molten metal cannot enter between the back of the matrix and the inner face of the box but passes between the face of the matrix and the core.

Figure 5:
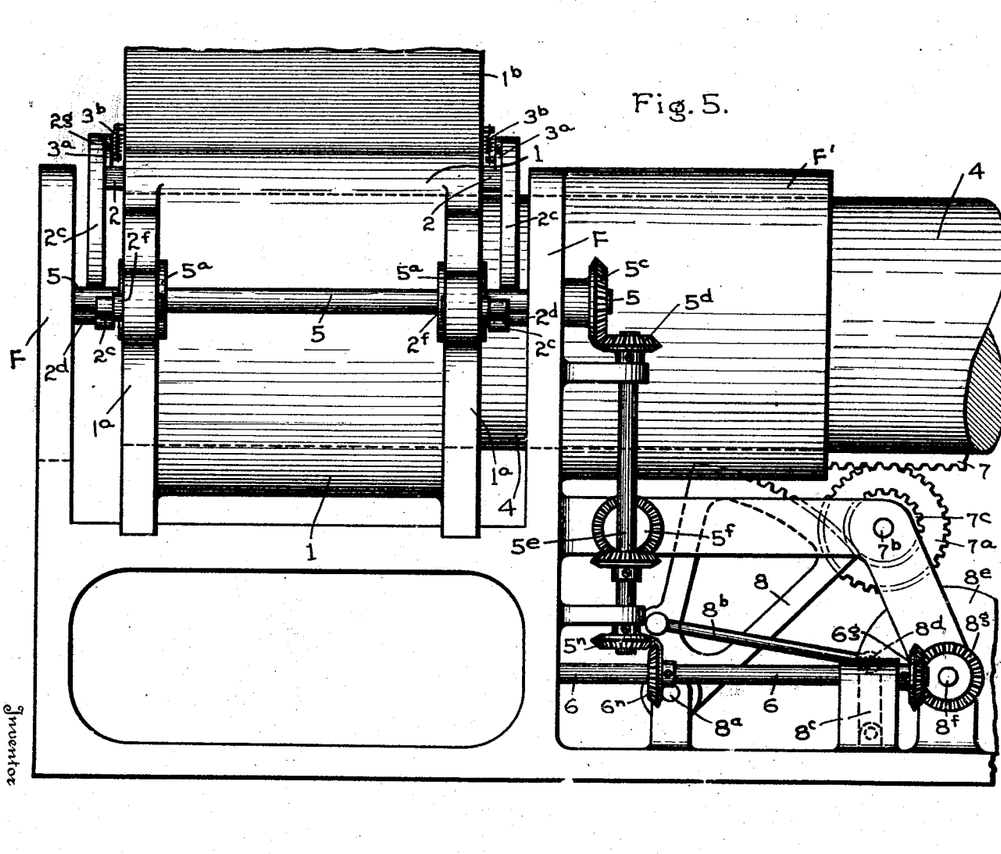
Fig. 5 is an end elevation of the box.
Figure 6:
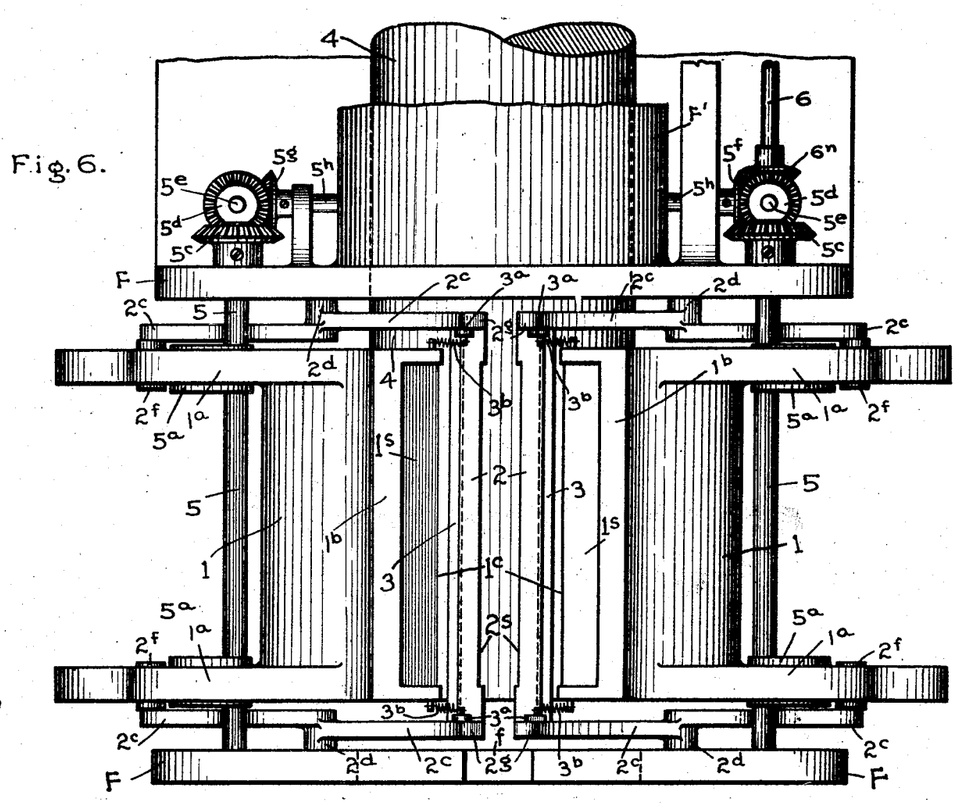
Fig. 6 is a top plan view of the box open.

Slidably mounted in the frame is a core 4 which is disposed axially of the box when the latter is closed. The core may be supported by and projects through a tubular extension F' of the frame, as shown in Figs. 5 and 6.

The core 4 may be reciprocated by any suitable means, preferably as hereinafter explained, and when in retracted position (Figs. 5 and 6) its outer end lies in position between the member 1—1 of the box and forms the inner wall of the mold, (see Figs. 1, 2, and 8). The said members 1 are provided at their outer ends with the semicircular flanges 1ʳ which form the outer end wall of the mold chambers, and an annular flange or collar 4ʳ on the core 4 forms the rear end wall of the mold chamber, see Fig. 8. As the mold is opened the flanges 1ʳ are drawn away from the core, and then the core 4 can be advanced so as to carry the cast plate outward through an opening in the front plate F of the frame; this front plate being also provided with a vertical slot f to permit the passage of the sprue or head formed on the plate in the casting operation.

When the parts are in the positions shown in Figs. 1 and 2 the box is ready for casting a plate. The molten metal is poured into the funnel shaped mouth 1ˢ and passes then through the mouth 1ᶜ and the mouth 2ʳ between the bars 2 into the mold chamber and spreading laterally passes beneath the ends of the matrix and fills the mold. The inner portions of the bars 2 form the desired slot p in the plate P, the sprue of the cast plate rising from the center of this slot as indicated in dotted lines in Fig. 3. With this construction it will be seen that the molten metal will enter the mold beneath the ends of the matrix M and will tend to spread the matrix properly in the mold and can not enter between the ends of the matrix and the concaved faces of the members 1 and spoil the plate.

Figure 4:
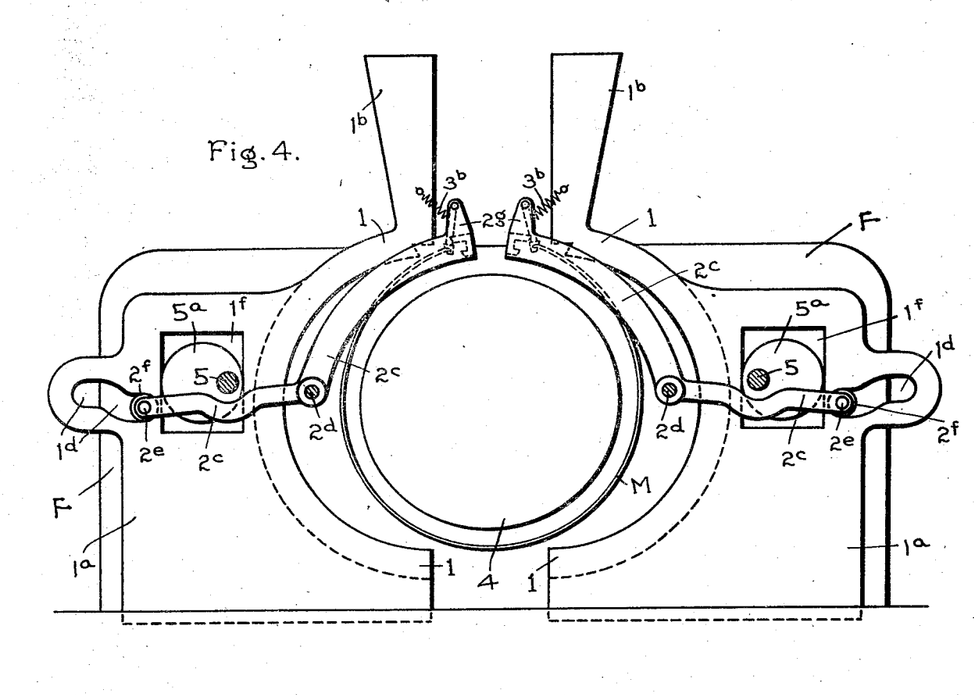
Fig. 4 is a view similar to Fig. 1 but showing the box open.

When the box members are separated, as in Figs. 3 and 4, the bars 2 are swung out and away from the recesses 1ᵉ and the matrix holders 3 are swung out of the slots $2^a$ by the action of the springs $3^b$, thus freeing the matrix M from the cast plate (see Fig. 3) and leaving the plate P suspended on the core 4. The sprue of the plate is wedge shaped and extends up between the bar D and the flanges $1^b$, as shown in dotted lines at $p'$ in Fig. 3, and is cut off by any suitable means after the plate is removed from the box.

It is not necessary but preferable, to have both members 1 of the box movable. The movable member or members of the box may be operated by any suitable means. As shown the flanges $1^a$ of the box are provided with slots $1^f$ which are engaged by cams $5^a$ on transverse shafts 5 journaled in suitable bearings in the frame F. Shafts 5 are driven by bevel gears $5^d$, $5^c$ from upright shafts $5^e$ mounted in suitable bearings on the main frame. The shafts $5^e$ may be connected by any suitable means so that they will operate alike and in same times.

Figure 7:
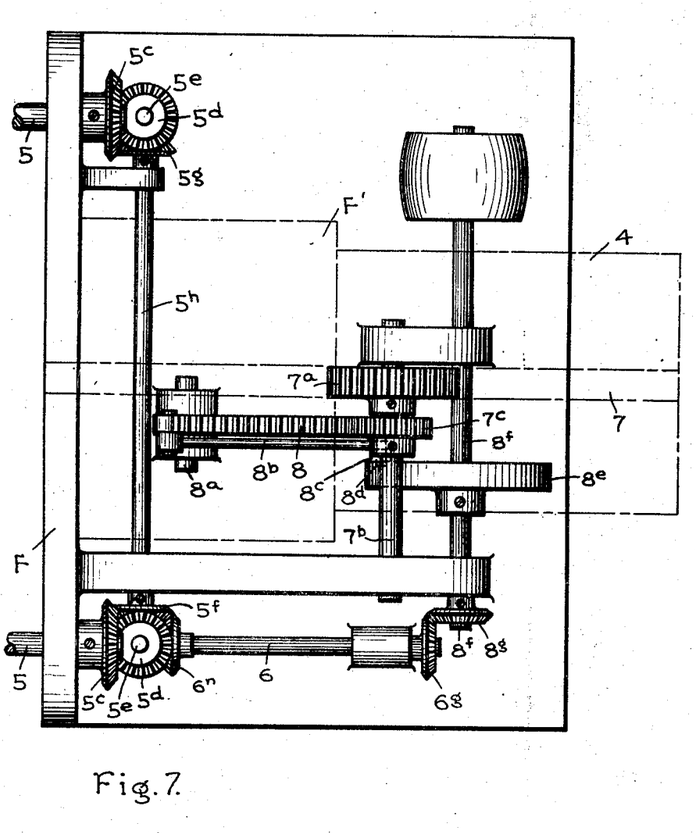
Fig. 7 is a detail plan view of the core reciprocating mechanism.

As shown in Figs. 5, 6, and 7 a countershaft $5^h$ may be geared to both shafts $5^e$ by bevel gears $5^f$ and $5^g$. One of the shafts $5^e$ may be driven by bevel gears $5^n$ and $6^n$ from a countershaft 6 suitably journaled in the frame. Attached to the underside of the core 4 is a rack 7, which meshes with a pinion $7^a$ on a short shaft $7^b$ suitably supported in the frame, and which carries a pinion $7^c$ meshing with an oscillating segment 8 pivoted on a stud $8^a$ on the frame. The segment 8 is connected by a link $8^b$ to a lever $8^c$ pivoted on the frame, said lever having a pin $8^d$ engaging a race cam $8^e$ mounted on a shaft $8^f$, which may be driven by bevel gears $8^g$ and $6^g$ from shaft 6.

Suitable means (not shown) may be provided to manually control the operation of the parts and whereby the segment 8 may be operated to move the rack 7 and core 4 back or forth at the proper time.

*Operation.*

When the box is closed as in Figs. 1 and 2, the molten metal is poured into the box through the pouring mouth $1^s$ and forms the plate. Then, either manually or through proper mechanism motion is imparted to shafts 5 so as to move the members 1 of the box away from the core 4, leaving the plate P thereon; the matrix being stripped therefrom, as indicated in Fig. 3, during the outward movement of the members. This stripping is produced as the box members separate by the action of the cams $1^e$ on the levers $2^c$, which act to raise the bars 2 and matrix holders 3 and start the matrix ends away from the plate. As the matrix ends are lifted clear of the plate the springs $3^b$ cause the matrix holders 3 to swing out of the slots in the bars 2 and clear the matrix from the plate, (see Figs. 3 and 4). The box members remain in separated position until it is desired to close the box preparatory to casting another plate. After the box is opened the core 4 is moved endwise carrying the plate P out, and the plate is removed by hand, or can be delivered to finishing mechanism (not shown). The core is then returned to casting position before the box is closed. The closing action of the parts is the reverse of the opening action and completes the cycle. When the box is closed, as in Figs. 1, 2, and 8, the parts are ready for pouring.

What I claim is:

1. A box for casting tubular stereotype plates having a pouring mouth or slot in one side, said mouth extending longitudinally of the box and adapted to direct metal between the adjacent ends of a matrix when the latter is properly positioned in the box.

2. A box for casting tubular stereotype plates comprising a core, and opposite members adapted to surround the core and having portions forming a longitudinal pouring mouth in the side of the box.

3. In a casting box as set forth in claim 2; means for holding a matrix in the box around the core during the casting operation.

4. In a casting box as set forth in claim 2; means whereby the matrix is stripped from the plate when the box is opened.

5. In a casting box as set forth in claim 2; means for holding the matrix in the box and around the core during the casting operation, and means whereby the matrix is stripped from the plate when the box is opened.

6. In a casting box as set forth in claim 2; a bar extending longitudinally of the mouth and adapted to be positioned at one side thereof during the casting operation to form a longitudinal groove in the cast plate.

7. In a casting box as set forth in claim 2; a bar extending longitudinally of the mouth adapted to be positioned at one side thereof during the casting operation to form a longitudinal slot in the plate; and means for positioning the bar when the box is closed, and for separating the bar from the box when the latter is opened.

8. In a casting box as set forth in claim 2; a bar extending longitudinally of the pouring mouth and adapted to be positioned to one side thereof during the casting operation; and means to position a matrix around the core during the casting operation, and means for loosening the matrix from the plate after the casting operation.

9. In a casting box as set forth in claim 2; a bar extending longitudinally of the pouring mouth and adapted to be positioned to one side thereof during the casting operation to form a longitudinal slot in the plate; and means to position a matrix around the core during the casting operation and means for automatically loosening the matrix from the plate after the casting operation.

10. In a casting box as set forth in claim 2; a bar extending longitudinally of the mouth and adapted to be positioned at one side thereof during the casting operation to form a longitudinal slot in the plate; means for positioning the bar when the box is closed, and for separating the bar from the box when the latter is opened; and a matrix holder removably positioned in the said bar adapted to hold a matrix in position around the core during the casting operation, and to loosen the matrix from the plate after the casting operation.

11. In a box for casting tubular stereotype plates, a core, opposite members adapted to surround the core having longitudinal slots in their opposed meeting edges forming a mouth extending longitudinally of the box, and means for moving the members to open or close the box.

12. In combination with a casting box as set forth in claim 11; means for holding a matrix in the box and around the core during the casting operation.

13. In combination with a casting box as set forth in claim 11; means whereby the matrix is stripped from the plate when the box is opened.

14. In combination with a casting box as set forth in claim 11; means for holding the matrix in the box and around the core during the casting operation and means whereby the matrix is stripped from the plate when the box is open.

15. In combination with a casting box as set forth in claim 11; a bar extending longitudinally of the mouth and adapted to be positioned at one side thereof during the casting operation to form a longitudinal slot in the plate.

16. In combination with a casting box as set forth in claim 11; a bar extending longitudinally of the mouth and adapted to be positioned at one side thereof during the casting operation to form a longitudinal slot in the plate; and means for automatically separating the bar from the box when the latter is opened.

17. In combination with a casting box as set forth in claim 11; a bar extending longitudinally of the mouth and adapted to be positioned at one side thereof during the casting operation; and means to position a matrix around the core during the casting operation and for automatically loosening the matrix from the plate after the casting operation.

18. In combination with a casting box as set forth in claim 11; a bar extending longitudinally of the mouth and adapted to be positioned at one side thereof during the casting operation to form a longitudinal slot in the plate; and means to position a matrix around the core during the casting operation and for loosening the matrix from the plate after the casting operation.

19. In combination with a casting box as set forth in claim 11; a bar extending longitudinally of the mouth and adapted to be positioned at one side thereof during the casting operation; means for positioning the bar when the box is closed, and for separating the bar from the box when the latter is opened; and a matrix holder removably positioned in the said bar adapted to position a matrix around the core during the casting operation; and to automatically loosen the matrix from the plate after the casting operation.

20. In a stereotype plate casting box, a core, opposite members adapted to surround the core to form a casting box and having projecting portions adjacent their meeting edges; means for separating the members to open or close the box; said box having a mouth extending longitudinally of the core and formed between the projecting portions and meeting edges of the said members when the box is closed, said mouth being adapted to direct metal between the adjacent edges of a matrix when the latter is properly positioned in the box.

21. A box for casting stereotype-tubular-page plates comprising opposite members having a longitudinal mouth between their meeting edges; said members having projecting flanges on their meeting edges beside the mouth, said flanges being recessed in their meeting faces to direct molten metal into the mouth.

22. A box for casting stereotype-tubular-page plates comprising a core, opposite members adapted to surround the core, and having a longitudinal pouring mouth between their longitudinal meeting edges and projecting flanges beside the mouth, said flanges being recessed on their meeting faces to direct molten metal into the mouth.

23. In combination with a casting box as set forth in claim 22; means for holding a matrix in the box and around the core during the casting operation.

24. In combination with a casting box as set forth in claim 22; means whereby the matrix is stripped from the plate when the box is opened.

25. In combination with a casting box as set forth in claim 22; means for holding the matrix in the box and around the core during the casting operation, and means whereby the matrix is stripped from the plate when the box is open.

26. In combination with a casting box as set forth in claim 22; a bar extending longitudinally of the pouring mouth and adapted to be positioned at one side thereof during the casting operation to form a longitudinal slot in the plate.

27. In combination with a casting box as set forth in claim 22; a bar extending longitudinally of the pouring mouth and adapted to be positioned at one side thereof during the casting operation to form a longitudinal slot in the plate; and means for positioning the bar when the box is closed, and for separating the bar from the box when the latter is opened.

28. In combination with a casting box as set forth in claim 22; a bar extending longitudinally of the pouring mouth and adapted to be positioned at one side thereof during the casting operation and means to hold a matrix in position around the core during the casting operation and for loosening the matrix from the plate after the casting operation.

29. In combination with a casting box as set forth in claim 22; a bar extending longitudinally of the pouring mouth and adapted to be positioned at one side thereof during the casting operation, and means to hold a matrix in position around the core during the casting operation and for loosening the matrix from the plate after the casting operation.

30. In combination with a casting box as set forth in claim 22; a bar extending longitudinally of the pouring mouth and adapted to be positioned at one side thereof during the casting operation; and means for automatically positioning the bar when the box is closed, and for automatically separating the bar from the box when the latter is opened; and a matrix holder removably positioned in the said bar adapted to hold a matrix in position around the core during the casting operation and to automatically loosen the matrix from the plate after the casting operation.

31. In combination with a box for casting tubular stereotype plates, said box members surrounding the core, and having a longitudinal mouth adapted to direct metal into the box between the adjacent ends of a matrix properly positioned in the box; means for holding a matrix in the box around the core during the casting operation and whereby the matrix is stripped from the plate when the box is opened.

32. In combination with a tubular plate casting box having a longitudinal mouth, a bar extending longitudinally of the mouth and adapted to be positioned at one side thereof during the casting operation to form a longitudinal slot in the plate.

33. In combination with a tubular plate casting box having a longitudinal mouth; a bar extending longitudinally of the mouth adapted to be positioned at one side thereof during the casting operation to form a longitudinal slot in the plate; and means for automatically positioning the bar when the box is closed, and for automatically separating the bar from the box when the latter is opened.

34. In combination with a tubular plate casting box; a bar extending longitudinally of the mouth and adapted to be positioned to one side thereof during the casting operation to form a longitudinal slot in the plate; and means to hold a matrix in position around the core during the casting operation and means for loosening the matrix from the plate after the casing operation.

35. In combination with a tubular plate casting box having a longitudinal mouth and a core, a bar extending longitudinally of the pouring mouth and adapted to be positioned at one side thereof during the casting operation to form a longitudinal slot in the plate; and means to hold a matrix in position around the core during the casting operation and means for automatically loosening the matrix from the plate after the casting operation.

36. In combination with a casting box having a longitudinal mouth and core; a bar extending longitudinally of the pouring mouth and adapted to be positioned at one side thereof during the casting operation to form a longitudinal slot in the plate; and means for automatically positioning the bar when the box is closed, and for automatically separating the bar from the box when the latter is opened; and a matrix holder removably positioned in the said bar adapted to hold a matrix in position around the core during the casting operation, and to automatically loosen the matrix from the plate after the casting operation.

37. In a tubular plate casting box, a core, a member movable to or from the core, and having a recess adjacent the mouth of the box, and a bar adapted to engage the recess, and matrix holding means at the inner side of said bar.

38. In a tubular plate casting box, a core, a member movable to or from the core having a recess adjacent the mouth of the box, a bar adapted to engage the recess, and form a slot in the cast plate.

39. In mechanism as set forth in claim 38; said bar having a longitudinal slot, and a matrix holding member removably engaged with said slot.

40. In mechanism as set forth in claim 38; means whereby the bar is automatically positioned in the recess as the box is closed, and automatically disengaged therefrom as the box is opened.

41. In mechanism as set forth in claim 38; rocking levers supporting said bar, means for operating the levers to move the bar into position to engage the recess when the box is closed, and to move it away from the recess when the box is opened.

42. In mechanism as set forth in claim 38; said bar having a longitudinal slot, a matrix holding member removably engaged with said slot, and means whereby the bar is automatically positioned in the recess as the box is closed and automatically disengaged therefrom when the box is opened.

43. In mechanism as set forth in claim 38; said bar having a longitudinal slot, a matrix holding member removably engaged with said slot, rocking levers supporting said bar, and means for operating the levers to move the bar into position to engage the recess when the box is closed and to move it away from the recess when the box is opened.

44. In a box for casting tubular stereotype plates, a core, a pair of semicylindric members movable to or from the core and adapted to surround the core, each member having a slot in its longitudinal meeting edge to form the mouth of the box, said mouth being adapted to direct metal into the box between the adjacent ends of a matrix when properly positioned in the box.

45. In a casting box, a core, a pair of semicylindric members movable to or from the core, each member having a slot in its meeting edge to form the mouth of the box, and having a recess adjacent such slot, bars adapted to engage the recesses, and matrix holding means carried by said bars.

46. In mechanism as set forth in claim 45; each bar having a longitudinal slot, and a matrix holding member removably engaged with said slot.

47. In mechanism as set forth in claim 45; means whereby the bars are automatically positioned in the recesses as the box is closed, and automatically disengaged therefrom when the box is opened.

48. In mechanism as set forth in claim 45; rocking levers supporting said bars means for operating the levers to move the bars into position to engage the recesses when the box is closed, and to move them away from the recesses when the box is opened.

49. In mechanism as set forth in claim 45; each bar having a longitudinal slot and a matrix holding member removably engaged with said slot; means whereby the bars are automatically positioned in the recesses as the box is closed and automatically disengaged therefrom when the box is opened.

50. In mechanism as set forth in claim 45; each bar having a longitudinal slot, and a matrix holding member removably engaged with said slot; rocking levers supporting said bars, and means for operating the levers to move the bars into position to engage the recesses when the box is closed and to move them away from the recesses when the box is open.

51. In mechanism as set forth in claim 45; means whereby the bars are automatically positioned in the recesses as the box is closed and automatically disengaged therefrom as the box is opened; each bar having a longitudinal slot, a matrix holding member removably engaged with each slot; and means to move the members into position to enter the slots when the box is closed and to move them out of the slots when the box is opened.

52. A box for casting sterotype plates having a longitudinal pouring mouth in its side; a bar extending londitudinally of the mouth having a slot in alignment with and forming a continuation of the pouring mouth for directing the molten metal into the mold.

53. In a casting box as set forth in claim 1; a bar extending longitudinally of the mouth and adapted to be positioned at one side thereof during the casting operation to form a longitudinal slot in the cast plate.

54. A box for casting stereotype plates having a longitudinal pouring mouth in its sides; a bar extending longitudinally of the mouth and adapted to be positioned at one side thereof during the casting operation and having a slot in alignment with the pouring mouth and forming a continuation of said mouth for directing the molten metal into the mold.

55. In a casting box as set forth in claim 54; means for positioning the bar when the box is closed and for separating the bar from the pouring mouth when the box is opened.

56. In a casting box as set forth in claim 2; a bar extending longitudinally of the mouth and adapted to be positioned at one side thereof during the casting operation and having a slot forming a continuation of the pouring mouth for directing the molten metal into the mold.

57. In a casting box as set forth in claim 2, a bar extending longitudinally of the mouth and adapted to be positioned at one side thereof during the casting operation to form a longitudinal groove in the plate, said bar having a slot in alignment with and forming a continuation of said pouring mouth for directing the molten metal into the mold; and means for positioning the bar when the box is closed and separating the bar from the mouth when the box is opened.

58. In a casting box as set forth in claim 11, a bar extending longitudinally of the mouth and adapted to be positioned at one side thereof during the casting operation said bar having a slot forming a continuation of the pouring mouth for directing the molten metal into the mold.

59. In combination with a casting box as set forth in claim 12, a bar extending longitudinally of the mouth and adapted to be positioned at one side thereof during the casting operation to form a longitudinal groove in the plate, said bar having a slot in alignment with the pouring mouth and forming a continuation of said mouth for directing the molten metal into the mold, and means for positioning the bar when the box is closed and separating the bar from the box when the latter is open.

60. In a casting box as set forth in claim 22; a bar extending longitudinally of the mouth and adapted to be positioned at one side thereof during the casting operation and having a slot forming a continuation of the pouring mouth for directing the molten metal into the mold.

61. In a casting box as set forth in claim 22, a bar extending longitudinally of the mouth and adapted to be positioned at one side thereof during the casting operation to form a longitudinal groove in the plate, said bar having a slot in alignment with and forming a continuation of said pouring mouth for directing the molten metal into the mold, and means for positioning the bar when the box is closed and separating the bar from the box when the latter is open.

62. In a casting box, a core, a semi-cylindric member movable to or from the core, each member having a slot in its meeting edge to form the mouth of the box, and having a recess adjacent such slot, bars adapted to engage the recesses, each bar adapted to form a longitudinal groove in the plate, during the casting thereof, and forming between them a slot for directing the molten metal into the mold.

63. In a casting box, a core, a pair of semi-cylindric members movable to or from the core, each member having a slot in its meeting edge to form the mouth of the box, and having a recess adjacent such slot; bars adapted to engage the recesses, each bar adapted to form a longitudinal groove in the plate, during the casting thereof, and having a slot in alignment with and forming a continuation of said pouring mouth for directing the molten metal into the mold; and matrix holding means carried by said bars.

64. In a casting box, a core, a pair of semi-cylindric members movable to or from the core, each member having a slot in its meeting edge to form the mouth of the box, and having a recess adjacent such slot; bars adapted to engage the recesses, each bar adapted to form a longitudinal groove in the plate during the casting thereof, and having between them a slot in alignment with and forming a continuation of said pouring mouth for directing the molten metal into the mold; means for positioning the bar when the box is closed and separating the bar from the box when the latter is open; and matrix holding means carried by said bars.

In testimony that I claim the foregoing as my own, I affix my signature.

HENRY F. BECHMAN.